(12) United States Patent
Johnson et al.

(10) Patent No.: US 8,517,742 B1
(45) Date of Patent: Aug. 27, 2013

(54) LABOR RESOURCE TESTING SYSTEM AND METHOD

(75) Inventors: Charles Earl Johnson, Avondale, AZ (US); Frank Kaupa, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 789 days.

(21) Appl. No.: 10/908,560

(22) Filed: May 17, 2005

(51) Int. Cl.
*G06Q 10/00* (2012.01)

(52) U.S. Cl.
USPC .......... 434/323; 434/322; 434/350; 434/353; 705/8

(58) Field of Classification Search
CPC .................................................. G06Q 10/00
USPC ............... 345/157; 434/118, 156, 178, 219, 434/236, 258, 276, 317, 322, 323, 350, 353, 434/354, 362, 535, 363; 463/9, 42; 600/300, 600/558; 700/83, 90; 702/108, 119, 185, 702/189; 705/7, 8, 9, 10, 11, 400; 706/11, 706/16, 21, 45, 60; 707/1, 5, 10, 102, 104.1; 709/219, 220; 710/9; 713/184; 714/4, 38, 714/46; 715/500, 513, 705, 744; 717/101, 717/124; 703/22; 704/1
See application file for complete search history.

(56) References Cited

U.S. PATENT DOCUMENTS

| | | | | |
|---|---|---|---|---|
| 5,164,897 A * | 11/1992 | Clark et al. | ................. | 705/321 |
| 5,565,316 A * | 10/1996 | Kershaw et al. | ............... | 434/322 |
| 5,671,409 A * | 9/1997 | Fatseas et al. | ............... | 707/104.1 |
| 5,827,070 A * | 10/1998 | Kershaw et al. | ............... | 434/322 |
| 5,832,497 A * | 11/1998 | Taylor | ................. | 707/104.1 |
| 5,862,223 A * | 1/1999 | Walker et al. | ................. | 705/50 |
| 5,879,165 A * | 3/1999 | Brunkow et al. | ............... | 434/322 |
| 5,884,270 A * | 3/1999 | Walker et al. | ................. | 705/1 |
| 5,926,794 A * | 7/1999 | Fethe | ................. | 705/11 |
| 5,978,767 A * | 11/1999 | Chriest et al. | ................. | 705/1 |
| 6,049,776 A * | 4/2000 | Donnelly et al. | ............ | 705/7.14 |
| 6,126,448 A * | 10/2000 | Ho et al. | ................. | 434/219 |
| 6,213,780 B1 * | 4/2001 | Ho et al. | ................. | 434/219 |
| 6,280,198 B1 * | 8/2001 | Calhoun et al. | ............... | 434/236 |
| 6,289,340 B1 * | 9/2001 | Puram et al. | ................. | 707/5 |
| 6,385,620 B1 * | 5/2002 | Kurzius et al. | ............. | 707/104.1 |
| 6,524,109 B1 * | 2/2003 | Lacy et al. | ................. | 434/219 |
| 6,569,012 B2 * | 5/2003 | Lydon et al. | ................. | 463/9 |
| 6,618,734 B1 * | 9/2003 | Williams et al. | ........... | 707/104.1 |
| 6,681,098 B2 * | 1/2004 | Pfenninger et al. | ........... | 434/362 |
| 6,735,570 B1 * | 5/2004 | Lacy et al. | ................. | 705/7 |
| 6,742,002 B2 * | 5/2004 | Arrowood | ................. | 1/1 |
| 6,873,964 B1 * | 3/2005 | Williams et al. | ................. | 705/9 |
| 6,984,177 B2 * | 1/2006 | Lydon et al. | ................. | 463/42 |
| 7,027,998 B2 * | 4/2006 | Younger | ................. | 705/9 |
| 7,080,057 B2 * | 7/2006 | Scarborough et al. | ........ | 706/60 |

(Continued)

*Primary Examiner* — Xuan Thai
*Assistant Examiner* — Alvin Carlos
(74) *Attorney, Agent, or Firm* — Snell & Wilmer L.L.P.

(57) ABSTRACT

A system and method for testing labor resources is disclosed. The method includes defining core skill set requirements for a project and/or job and defining each according to expertise and experience requirements is disclosed. The defined skill set requirements and their corresponding expertise levels are provided into a tool via a web interface where they are used to compile an examination from questions selected from a database. The invention further administers the compiled examination to one or more candidates, scores the examination, transmits results and analysis to a hiring manager and accepts subjective input from the hiring manger following a personal interview. Subjective input is used to adjust future weighting values of the examination questions.

18 Claims, 4 Drawing Sheets

(56) References Cited

U.S. PATENT DOCUMENTS

| | | | |
|---|---|---|---|
| 7,219,066 B2* | 5/2007 | Parks et al. | 705/1.1 |
| 7,233,971 B1* | 6/2007 | Levy | 709/203 |
| 7,295,991 B1* | 11/2007 | Clarke et al. | 705/8 |
| 7,310,626 B2* | 12/2007 | Scarborough et al. | 706/60 |
| 7,457,764 B1* | 11/2008 | Bullock et al. | 705/7.14 |
| 7,698,146 B2* | 4/2010 | Cullen, III | 705/1.1 |
| 7,797,191 B2* | 9/2010 | Cotten et al. | 705/14.5 |
| 2001/0031457 A1* | 10/2001 | Pfenninger et al. | 434/350 |
| 2002/0002479 A1* | 1/2002 | Almog et al. | 705/8 |
| 2002/0019940 A1* | 2/2002 | Matteson et al. | 713/184 |
| 2002/0042786 A1* | 4/2002 | Scarborough et al. | 706/21 |
| 2002/0055866 A1* | 5/2002 | Dewar | 705/8 |
| 2002/0106617 A1* | 8/2002 | Hersh | 434/236 |
| 2002/0128892 A1* | 9/2002 | Farenden | 705/8 |
| 2002/0128893 A1* | 9/2002 | Farenden | 705/8 |
| 2002/0128894 A1* | 9/2002 | Farenden | 705/8 |
| 2002/0198766 A1* | 12/2002 | Magrino et al. | 705/11 |
| 2003/0101091 A1* | 5/2003 | Levin et al. | 705/11 |
| 2003/0138759 A1* | 7/2003 | Rowley et al. | 434/219 |
| 2003/0182171 A1* | 9/2003 | Vianello | 705/9 |
| 2003/0191680 A1* | 10/2003 | Dewar | 705/8 |
| 2003/0195786 A1* | 10/2003 | Dewar | 705/8 |
| 2003/0200136 A1* | 10/2003 | Dewar | 705/11 |
| 2005/0026130 A1* | 2/2005 | Crowhurst et al. | 434/362 |
| 2005/0033632 A1* | 2/2005 | Wu et al. | 705/10 |
| 2005/0267794 A1* | 12/2005 | Forte | 705/9 |
| 2005/0278205 A1* | 12/2005 | Kato | 705/7 |
| 2006/0080116 A1* | 4/2006 | Maguire et al. | 705/1 |
| 2006/0100919 A1* | 5/2006 | Levine | 705/11 |
| 2006/0111959 A1* | 5/2006 | Tarr et al. | 705/10 |

* cited by examiner

LABOR RESOURCE TESTING SYSTEM AND METHOD

FIELD OF INVENTION

The invention generally relates to online administration of examinations to prospective employees and/or contractors, and more particularly, to a system and method for accurately measuring specific skill sets and practical knowledge against project or job requirements.

BACKGROUND OF INVENTION

People with experience in the hiring of employees, whether as a small business owner or as a personnel manager for a large corporation, understand the costs associated with the hiring of new employees. Aside from the interview process, background checks, completion of forms and testing, new employees usually require some degree of training. The costs associated with employee training include, for example, the obvious expense of the training itself and the lack of productivity and negative contribution to the hiring entity during the training process. Therefore, hiring managers have employed a number of interviewing methodologies to reduce bad hiring decisions (i.e. to reduce the need for, or the amount of, training needed for new hires).

However, the interview process is highly subjective and therefore susceptible to false perceptions. No matter how skilled the interviewer, there are candidates who are equally skilled in convincingly overstating credentials such as, for example, skills, education, experience and abilities. Generally, a candidate's overstated credentials will not become apparent until well after the training process and the associated costs have been incurred. This is especially prominent and problematic in the Information Technology (IT) industry.

The IT industry is unique in that a single project may employ a number of very specialized experts working in tandem toward a project's successful completion. In many instances, a project's success or failure can hinge on the failure of a single team member. Therefore, the Project Manager's primary concern is usually to assign the right combination of labor resources to a project, which often requires a thorough understanding of the needed technologies. Since the IT employment market has diminished significantly over the past several years, competition for available IT jobs has increased. It is often difficult for the hiring manager to discern a true technology expert from a novice who is well read and knows how to speak with extensive knowledge about given technologies.

Therefore, a need exists for a system and method for assessing the skills and knowledge of prospective employees and/or contractors. More specifically, hiring managers need a tool to test and score a prospect's abilities relative to the specifics of the work the prospect will be expected to perform if hired. Moreover, a need exists for a tool that will provide a non-subjective assessment of a prospect's ability to perform at the quality and efficiency levels typically required for successful completion of projects and assignments.

SUMMARY OF INVENTION

The invention includes a system and method for enabling hiring managers to more effectively score employment candidates in direct relation to the specific responsibilities the candidate would be expected to perform. The computerized system provides a web interface for hiring managers to enter specific skill set requirements and classify each skill according to a desired level of expertise. A web interface is also provided for candidates, who may have been identified through a pre-screening process, to complete an examination as administered by the system. The examination is automatically created by compiling questions from a pool of examination questions. The questions are selected based upon the skill set requirements as defined by the hiring manager.

The system further scores the candidates knowledge relative to the hiring manager's specific needs and weights the final score against current and/or previously-negotiated rates in order to insure that the hiring entity receives qualified candidates at a rate corresponding to the candidate's specific credentials. Weighting attributes of individual examination questions are periodically modified according to post-interview scoring entered into the system by hiring managers. Through consensus, the invention may determine that the weighted value for a given examination question is too high, and therefore requires adjustment. Over time, the system accuracy increases due to such adjustments.

More particularly, the present invention includes a computer-implemented method for facilitating labor resource testing by receiving a skill requirement; receiving a level associated with the skill requirement; selecting at least one examination question based on the skill requirement and the level; displaying the at least one examination question to the labor resource; receiving an answer to the examination question from the labor resource; scoring the answer to create an examination score; and, creating a report based upon the examination score.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

For the sake of brevity, conventional data networking, application development and other functional aspects of the systems (and components of the individual operating components of the systems) may not be described in detail herein.

Furthermore, the connecting lines shown in the various figures contained herein are intended to represent exemplary functional relationships and/or physical couplings between the various elements. It should be noted that many alternative or additional functional relationships or physical connections may be present in a practical system.

In general, the invention includes a system and method for identifying the most qualified and cost effective candidates for job positions. The system provides a web interface to enable hiring managers to enter skill set requirements and an examination interface to enable candidates to answer questions specific to the selected skill set requirements. As used herein, "requirements" or similar terms may include any desired skill, characteristic, demographic, background, experience or any other job candidate qualification.

Figure 1:
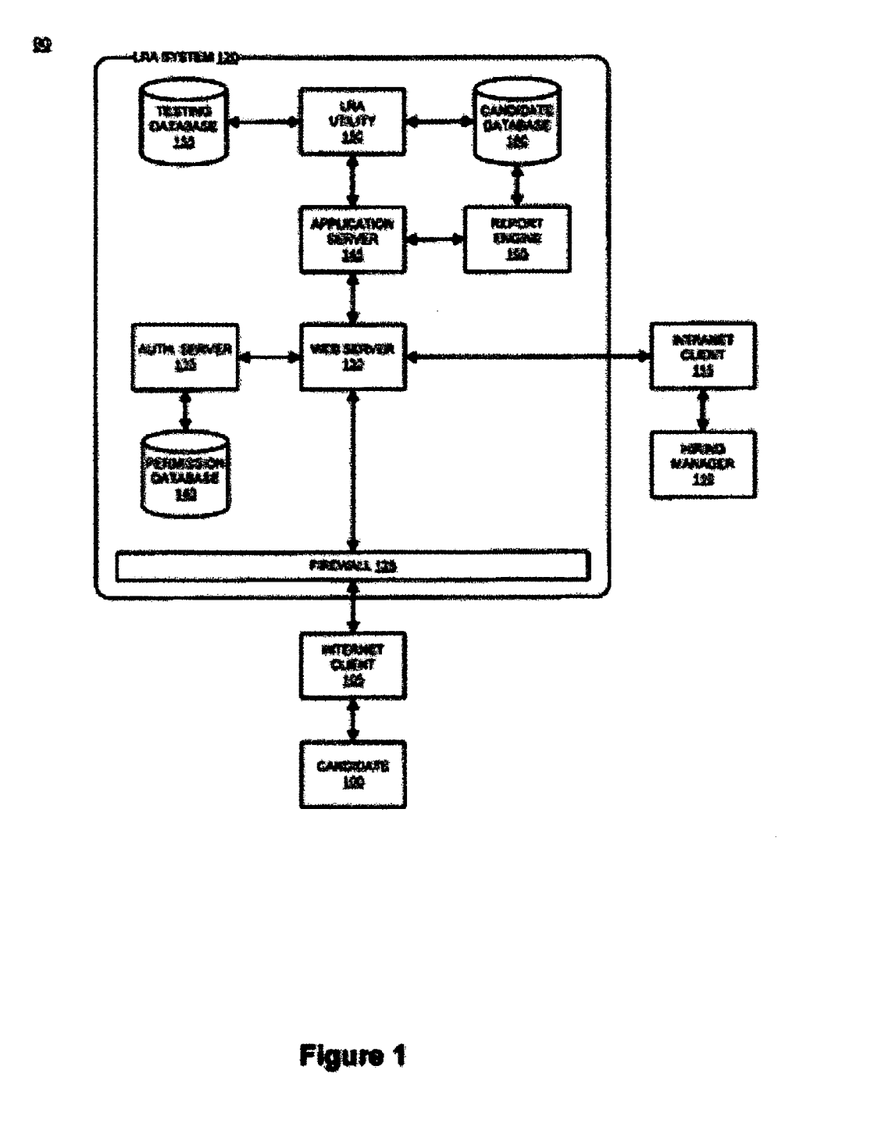
FIG. 1 is a block diagram illustrating the major system components for an exemplary tool for labor resource assessment, according to an embodiment of the present invention.

With reference to FIG. 1, the system 90 facilitates interaction between a candidate 100 and the Labor Resource Assessment (LRA) system 120 through, for example, an Internet client 105 with a network connection to a web server 130. System 90 further facilitates interaction between a hiring manager 110 and LRA system 120 through an intranet client 115 with a network connection to a web server 130. Web server 105 may employ an authentication server 135 in order to validate and assign proper permissions to authorized users of the system 90. Permission database 140 stores user credentials and permissions specific to each user. Web server 130 also employs an applications server 145 to manage various applications utilized by the system. Application server 145 may be a stand-alone server or may comprise software residing within web server 130. LRA utility 150 is invoked by application server 145 to compile examination questions based on skill set requirements as defined by hiring manager 110 and further facilitates the issuance of examination questions to candidates and scoring completed examinations. Examination questions are stored within testing database 155. LRA utility 150 stores data relating to skill set requirements, examination questions, scoring details, reports and the like within candidate database 160. Application server 145 also interfaces with a report engine 165 to create pre-configured and/or ad-hoc reports relating to candidate examinations.

In addition to the components discussed above, LRA system 120 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: candidate data; hiring data; question data; scoring data and algorithms and/or like data useful in the operation of system 90.

As will be appreciated by one of ordinary skill in the art, one or more of the components of system 90 may be embodied as a customization of an existing system, an add-on product, upgraded software, a stand alone system (e.g., kiosk), a distributed system, a method, a data processing system, a device for data processing, and/or a computer program product. Accordingly, individual system 90 components may take the form of an entirely software embodiment, an entirely hardware embodiment, or an embodiment combining aspects of both software and hardware. Furthermore, individual system 90 components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Candidate 100 may include any individual, business, entity, government organization, software and/or hardware which interacts with system 90 to answer examination questions as configured and administered by LRA utility 150. Candidate 100 may be, for example, a potential or current employee, contractor or any other individual who may be assessed for skill set aptitude. Candidate 100 may interface with LRA system 120 via any communication protocol, device or method discussed herein or known in the art. In one embodiment, candidate 100 may interact with LRA system 120 via an Internet browser at an Internet client 105.

Hiring manager 110 may include any individual, business, entity, government organization, software and/or hardware which interacts with system 90 to define candidate 100 skill set requirements and/or receive reports and other information relating to candidate 100 examination results. Hiring manager 110 may be, for example, a human resources manager, a project manager, department manager or any other individual who has been given authority to define skill set requirements for one or more job openings and/or has decision making authority to present employment offers based partly or fully on LRA system 120 assessment and personal interviews. Hiring manager 110 may interface with LRA system 120 via any communication protocol, device or method discussed herein or known in the art. In one embodiment, hiring manager 110 may interact with LRA system 120 via an Internet browser at Intranet client 115.

LRA utility 150 may include any hardware and/or software suitably configured to accept skill set requirements, configure and administer examinations, and report results to the appropriate hiring manager 110. LRA utility 150 may exist as a standalone computing device or as a software entity stored within applications server 145 or web server 130. LRA utility 150 may communicate directly or indirectly with one or more computing devices such as mainframe computers, for example. Further, LRA utility 150 may include business rules for compiling examinations, weighting questions and responses, and reporting examination results.

Figure 2:
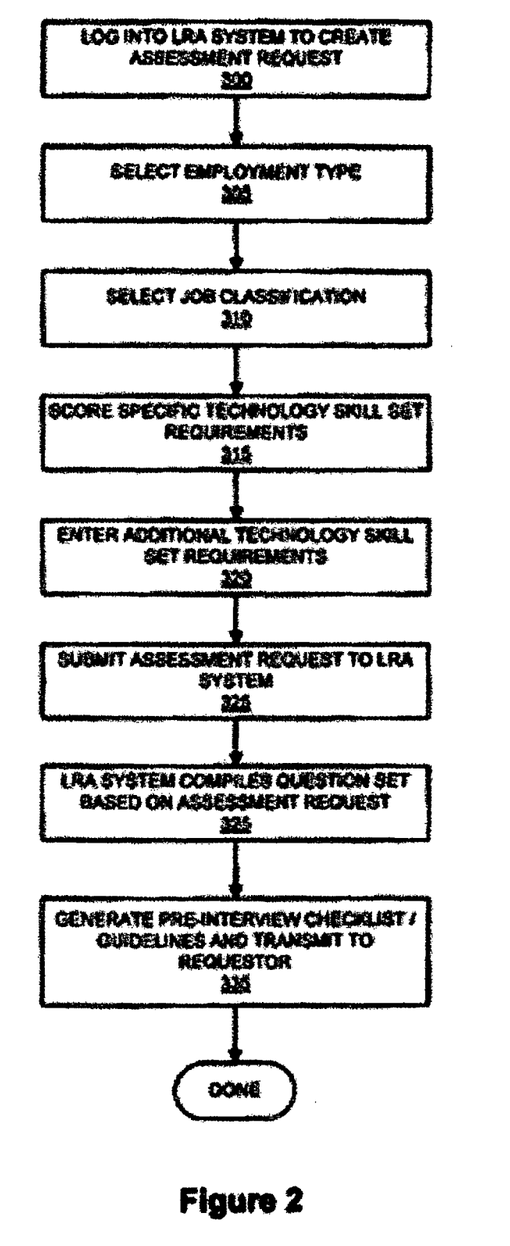
FIG. 2 is a flowchart illustrating an exemplary process for interacting with the invention through a user interface in order to define skill set requirements for any one or more jobs and/or projects, according to an embodiment of the present invention; and, FIGS. 3A and 3B are flowcharts illustrating an exemplary process for administering and analyzing an examination and adjusting weighting values and/or examination questions, according to an embodiment of the present invention.
Figure 3A:
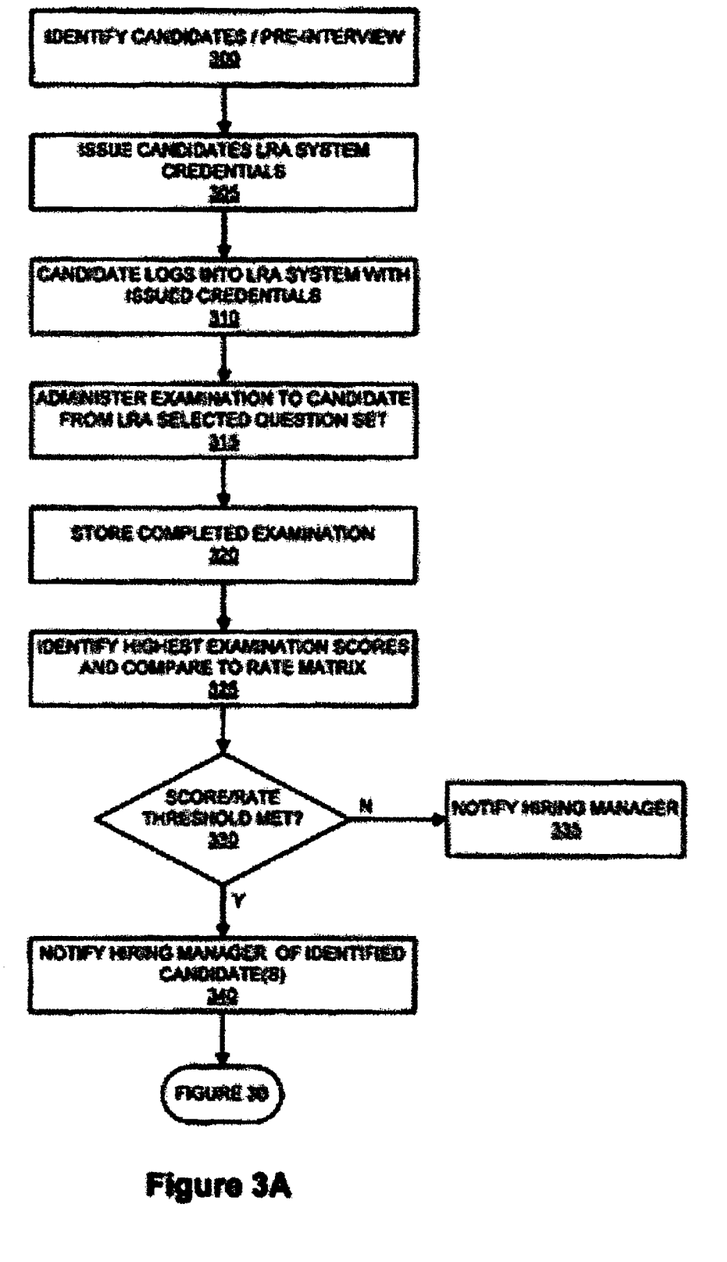
Figure 3B:
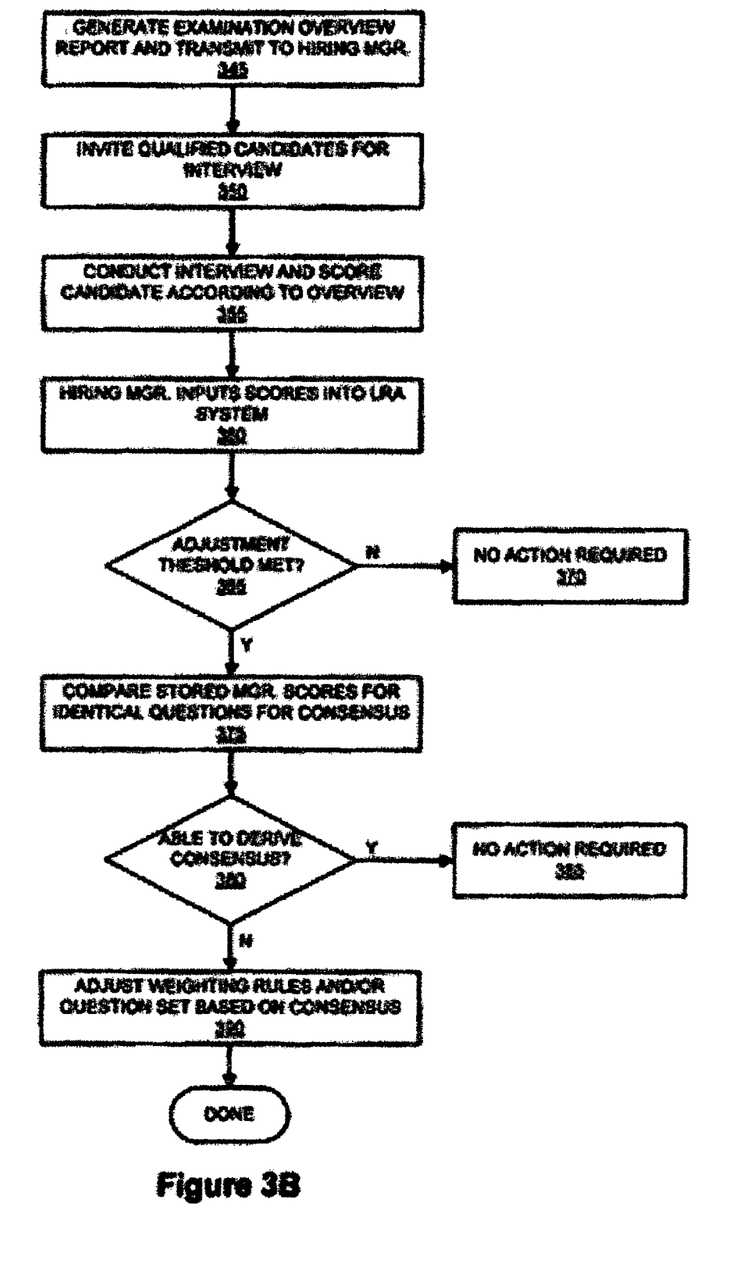

The process flows of FIGS. 2 and 3A-3B are merely embodiments of the system 90 and are not intended to limit the scope of the invention as described herein. For example, the steps recited in any of the method or process descriptions may be executed in any order and are not limited to the order presented. It will be appreciated that the following description makes appropriate references not only to the steps depicted in FIGS. 2-3B, but also to the various system components as described above with reference to FIG. 1.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Referring to FIG. 2, a flowchart illustrating an exemplary process for interacting with LRA system 120 through a user interface in order to define skill set requirements for any one or more jobs and/or projects is shown. System 90 may implement known methods for preventing access from unauthorized users such as requiring users to register and/or by assigning authentication credentials to individual users.

However, system 90 anticipates an authentication server 135 which is employed to enforce security policies by allowing varying levels of access to users based on such policies. Internet security protocols including methods of authentication and user management are well known in the art, therefore system 90 may employ any number of security architectures and authentication processes will not be described a greater detail herein.

In one embodiment, hiring manager 110 interacts with LRA system 120 to define skill set requirements for a job and/or project where a need exists for current or future additional labor resources. On successful logon to LRA system 120 to create a labor resource assessment request (step 300), hiring manager 110 selects an employment type (step 305). Employment type may include, for example, "contract", "part-time", "full-time", "temporary", "existing employee", "existing contractor", etc. Hiring manager 110 also selects a job classification (step 310) which refers to the general nature of the job and may include, for example, "software development", "web development", "software test", "quality assurance", "technical support", "hardware engineering", "network engineering", "analyst", "database administrator", "technical architect", "project management" and the like. Based on the selected job classification, LRA utility 150 is invoked to populate a skill set scoring web page with the technology applicable skill sets. The skill set scoring web page contains an extensive list of parent and child technologies. For example, a parent technology such as, "Object Oriented" may include the child technologies Java, C++, Visual Basic, .Net, JSP, ASP, COM, DCOM, SOAP, etc. Each parent technology has a corresponding text field or dropdown list where an overall score may be entered or selected. The score may be numerical or comprise various levels such as, for example, "No Experience", "Familiarity Only", "Beginner", "Intermediate", "Proficient" or "Expert". Each child technology includes corresponding text fields or dropdown lists where scores specific to each technology may be entered or selected (step 315).

In another embodiment, the skill set scoring page includes additional controls to enable hiring manager 110 to even further specify and/or narrow skill set requirements (step 320). For example, an additional field may be provided to enable the hiring manager 110 to specify a required number of months or years of experience is desired for the corresponding technology.

When hiring manager 110 has scored the desired technology skill sets, the assessment request is transmitted to LRA system 120 for processing (step 325). According to the selected technologies and scoring levels, LRA utility 150 selects appropriate questions from a number of pre-written questions stored within testing database 155. The selection of questions closely corresponds to the requirements as extracted from the assessment request. For example, a hiring manager has a project that, among other technologies, requires an expert level Java programmer. LRA utility 150 may configure a testing database 155 query to return all questions that relate to Java programming and are classified as expert level questions. The same may be repeated for each selected and scored technology from the assessment request.

In another embodiment, where hiring manager 110 is also prompted to select a desired number of months or years of experience, testing database 155 questions may also include a number of questions designed to test the candidate's truthfulness. For example, for a hiring manager 110 requiring a Visual Basic programmer with at least five years of experience, LRA utility 150 may further query testing database 155 for questions relating to the state of the Visual Basic technology that spans back as far as five years. System 90 also contemplates that LRA utility 150 may not only utilize search criteria to obtain pre-written questions, but LRA utility 150 may also create new questions based on requested criteria. For example, LRA utility 150 may utilize a question template with merge fields that incorporate requested criteria entries into the merge fields.

When LRA utility 150 compiles a list of examination questions in response to the assessment request, the set of questions or a subset thereof, is transmitted to hiring manager to serve as an interview checklist (step 335). The interview checklist may be used by hiring manager 110, or any other interviewer or computer testing system, to ask questions relating to the examination. This checklist is later used to provide feedback to LRA utility 150.

In another embodiment, LRA utility 150 selects a pre-configured examination from a plurality of specialized exams. Based on the required skill sets for a job, LRA utility identifies an appropriate examination that most closely matches the requirements. For example, a job may require varying levels of expertise in SQL Server, XML, and FrontPage. The levels of expertise may call for an expert level of SQL Server, a proficient level of XML and only a beginning level of FrontPage. Therefore, LRA utility 150 may select a pre-configured examination which includes 30 questions relating to SQL Server, 15 questions relating to XML and only 5 questions relating to FrontPage.

In still another embodiment, LRA utility 150 issues a single examination where question reflect a wide range of technologies where varying weighting levels are applied to each question based on a jobs skill level requirements. Using the prior example, questions relating to SQL Server may be assigned a value of 5 points, XML questions may be assigned a value of 3 points and FrontPage questions may be assigned a value of 1 point each.

While the steps above detail the process steps for creating an examination that is specifically tailored to the requirements of a project or job, practitioners will appreciate that additional steps may be added without departing from the spirit of the invention. Additional scoring categories may be added to further narrow the set of selected questions for inclusion within the examination.

Referring to FIGS. 3A and 3B a flowchart illustrating an exemplary process for administering and analyzing an examination and adjusting weighting values and/or examination questions is shown. When one or more job and/or project candidates have been identified, it is standard practice to perform a brief pre-interview (step 300). This is most often a screening process where a quick determination can be made by a hiring manager 110 whether candidate 100 possesses the minimum qualifications. While not illustrated, hiring manager 110 may enter information into LRA system 120, identifying and associating the candidate with a completed assessment request. LRA utility 150 stores this information within candidate database 160 and generates an email message addressed to candidate 100 and enclosing examination instructions and authentication credentials (step 305).

In one embodiment, when candidate 100 is ready to take the examination, he or she navigates to the proper URL through internet client 105, and when prompted, enters the issued LRA system 120 authentication credentials (step 310). The authentication credentials are used to verify the identity of candidate 100 and issue the appropriate examination questions that where previously selected based on the assessment request (step 315). Practitioners will appreciate that online testing systems and methods are known in the art, and therefore system 90 may employ any presently known or future testing environment and/or architectures. The examination may include any number of questions in any format and may further be timed. In one embodiment, the administration of the examination is provided by a third-party wherein the third party is provided a question set and a corresponding answer set. On completion of the examination, the results are transmitted to the LRA system 120 from the third party.

A completed examination is transmitted from Internet client 105 to LRA system 120 where the examination is scored by LRA utility 150 and stored within candidate database 160 (step 320). When one or more scores relating to an assessment request are determined, the requesting hiring manager 110 may check status by logging into the LRA system 120 and viewing a status web page, or notified via email or any other communications means known in the art. If more than one candidate 100 completed the examination, LRA utility 150 ranks candidates 100 by score and compares each to a rate matrix (step 325). A rate matrix defines an acceptable compensation rate based on a candidate's skill set and examination scoring. For example, a rate matrix may define a base rate of $35.00 per hour for a contractor with minimum Visual Basic skills, while the base rate for a Java programmer may be set at $40.00 per hour for the same contractor. However, for an assessment request requiring a Java programmer with expert rating, the rate matrix may define the rate at $60.00 per hour. However, an assessment request may have varying expertise level requirements for differing skill sets. For example, an assessment request may require candidates with an expert level of expertise in Java programming, an intermediate level of expertise in SQL Server and only a beginner level of expertise in Microsoft Project. The rate matrix in combination with the candidate's scores relative to each technology requirement will produce an optimal hourly rate.

If none of the candidates' scores meet a minimum threshold representing both the examination score and rate (step 330), then hiring manager 110 is notified (step 335). However, if at least one candidate 100 meets the score/rate threshold (step 330), then hiring manager 110 is notified of the identities of qualifying candidates (step 340). Further, LRA utility 150 invokes report engine 165 to compile and provide any additional information relating to the administration of the examination including, for example, examination scores, the amount of time it took candidate 100 to complete the examination, a curve representing all candidate scores, analysis, charts, graphs and the like (step 345). As previously noted the method for notification may include any communications method discussed herein or known in the art including Internet, intranet, email, fax, pager, telephone, postal mail and the like.

Based on human analysis of the examination results, hiring manager 110 may choose to invite qualified candidates for a personal interview (step 350). During an interview, hiring manager 110 may use the examination question set, produced from the assessment request, to subjectively score the candidate during the interview (step 355). For example, a candidate may have scored at an expert level for Oracle DBMS, however after questioning the candidate; the hiring manager 110 determines that the candidate fits more closely within an intermediate level of expertise. The in-person interview provides an additional layer of analysis to the hiring manager 110 who may choose to question more deeply or modify the nature of the questioning to better understand the discrepancy and make a more thoughtful hiring decision. This information is also useful as input into LRA utility 150 which will later use the information to refine its classification and/or weighting of questions in order to become a more accurate assessment tool over time.

At a point of time following the personal interview, hiring manager 110 inputs his or her scores (e.g., where they differ from the examination scores), into an interface to LRA system 120. LRA utility 150 is configured to store such scores to be used when a pre-defined number of hiring manager 110 scores have been collected referencing the same question. For example, LRA utility 150 may be configured to perform an analysis on all hiring manager scores entered, where they do not agree with the classification and/or weighting of the corresponding question. If a pre-defined threshold is met for a given question for which there is disagreement (step 365), then LRA utility 150 performs an analysis of the question by deriving a consensus (step 375). For example, on receiving the fifth hiring manager 110 score on the same question, LRA utility 150 may attempt to draw a consensus from all hiring manager scoring inputs to determine a classification and/or weighting adjustment to be applied to the question in concern. LRA utility 150 determines consensus by comparing a number of hiring manager 110 scores relating to a particular test question. If a pre-determined number of scores match, or fall within an acceptable threshold, then a consensus is derived. If a consensus cannot be derived from the scoring inputs (step 380), then no further action is taken (step 385). However, if a consensus is derived (step 380) from a series of hiring manager 110 scores defining a given question to be an intermediate level question and the question is weighted more highly within LRA system 120 because it has been defined as an expert level question, then the LRA utility may redefine the question as an intermediate level question, thus lowering its weighted value (step 390).

While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

Internet client 105 and intranet client 115 may each comprise any hardware and/or software suitably configured to facilitate input, receipt and/or review of any information related to LRA system 120 or any information discussed herein. Internet client 105 and intranet client 115 may each include any device (e.g., personal computer), which communicates (in any manner discussed herein) with the LRA system 120 via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that Internet client 105 and intranet client 115 may or may not be in direct contact with the LRA system 120. For example, they may access the services of the LRA system 120 through another server, which may have a direct or indirect connection to web server 130.

As those skilled in the art will appreciate, Internet client 105 and intranet client 115 may each include an operating system (e.g., Windows NT, 95/98/2000, OS2, UNIX, Linux, Solaris, MacOS, etc.) as well as various conventional support software and drivers typically associated with computers. Each client may include any suitable personal computer, network computer, workstation, minicomputer, mainframe or the like. Internet client 105 and intranet client 115 can be in a home or business environment with access to a network. In an exemplary embodiment, access is through a network or the Internet through a commercially available web-browser software package.

Internet client 105 and intranet client 115 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

System 90 contemplates uses in association with web services, utility computing, pervasive and individualized computing, security and identity solutions, autonomic computing, commodity computing, mobility and wireless solutions, open source, biometrics, grid computing and/or mesh computing.

Web server 130 may include any hardware and/or software suitably configured to facilitate communications between Internet client 105 and intranet client 115 and one or more LRA system 120 components. Further, web server 130 may be configured to transmit data to Internet client 105 and intranet client 115 within markup language documents. Web server 130 may operate as a single entity in a single geographic location or as separate computing components located together or in separate geographic locations. Requests originating from a client browser may pass through a firewall 125 before being received and processed at web server 130. As used herein, "transmit" may include sending electronic data from one system component to another over a network connection. Additionally, as used herein, "data" may include encompassing information such as commands, queries, files, data for storage, and the like in digital or any other form.

The web server 130 discussed herein may provide a suitable web site or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

Firewall 125, as used herein, may comprise any hardware and/or software suitably configured to protect LRA system 120 components from users of other networks. Firewall 125 may reside in varying configurations including Stateful Inspection, Proxy based and Packet Filtering among others. Firewall 125 may be integrated as software within web server 130, any other system components or may reside within another computing device or may take the form of a standalone hardware component.

Applications server 145 may include any hardware and/or software suitably configured to serve applications and data to a connected Internet client 105 and intranet client 115. Like web server 130, applications server 145 may communicate with any number of other servers, databases and/or components through any means known in the art. Further, applications server 145 may serve as a conduit between Internet client 105 and intranet client 115 and the systems and components of the LRA system 120 and Internet client 105 and intranet client 115. Web server 130 may interface with applications server 145 through any means known in the art including a LAN/WAN, for example. Application server 145 may further invoke LRA utility 150 and/or report engine 165 in response to candidate and/or hiring manager 110 requests.

Report engine 165 may include any hardware and/or software suitably configured to produce reports from information stored in one or more databases. Report engines 165 are commercially available and known in the art. Report engine 165 may provide printed reports, web access to reports, graphs, real-time information, raw data, batch information and/or the like. Report engine 165 may be implemented through commercially available hardware and/or software, through custom hardware and/or software components, or through a combination thereof. Further, report engine 165 may reside as a standalone system within LRA system 120 or as a component of applications server 145 or web server 130.

In order to control access to web server 130 or any other component of system 90, web server 130 may invoke an authentication server 135 in response to candidate 100 and hiring manager 110 submissions of authentication credentials received at web server 130. Authentication server 135 may include any hardware and/or software suitably configured to receive authentication credentials, encrypt and decrypt credentials, authenticate credentials, and grant access rights according to pre-defined privileges attached to the credentials. Authentication server 135 may grant varying degrees of application and data level access to users based on information stored within permission database 140. For example, a hiring manager 110 may be granted access to input and/or modify skill set requirements and view examination results while a candidate 100 may be limited to participating in an examination only.

Permission database 140 may include any hardware and/or software suitably configured to facilitate storing authentication and/or privilege information relating to users. Testing database 155 stores data relating examination questions. Candidate database 160 stores information relating to defined skill set criteria, baseline standards, compensation rules, examination scores and the like. One skilled in the art will appreciate that system 90 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of system 90, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with system 90 by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of system 90, the data can be stored without regard to a common format. However, in one exemplary embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 90 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 90 may consist of any combination thereof at a single location or at multiple locations, wherein each database or system includes any of various suitable security features, such as firewalls, access codes, encryption, decryption, compression, decompression, and/or the like.

The invention may be described herein in terms of functional block components, screen shots, optional selections and various processing steps. It should be appreciated that such functional blocks may be realized by any number of hardware and/or software components configured to perform the specified functions. For example, system 90 may employ various integrated circuit components, e.g., memory elements, processing elements, logic elements, look-up tables, and the like, which may carry out a variety of functions under the control of one or more microprocessors or other control devices. Similarly, the software elements of system 90 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 90 may employ any number of conventional techniques for data transmission, signaling, data processing, network control, and the like. Still further, system 90 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A system comprising:

a tangible, non-transitory memory communicating with a processor for providing an assessment of a labor resource, the tangible, non-transitory memory having instructions stored thereon that, in response to execution by the processor, cause the processor to perform operations comprising:

enabling, by the processor, selection of a skill requirement that is expected of an ideal labor resource from a plurality of skill requirements;

enabling, by the processor, input of a skill level associated with the selected skill requirement that is expected of the ideal labor resource;

determining, by the processor, at least one examination question of an examination for assessing the labor resource based on the selected skill requirement and the inputted skill level, wherein a weighting attribute is associated with the at least one examination question;

receiving, by the processor, an answer to the at least one examination question from the labor resource within a predetermined timeframe; verifying, by the processor, all examination questions of the examination are answered; scoring, by the processor, the answer to create at least a portion of an examination score, wherein the examination score is based, at least in part, on the weighting attribute associated with the at least one examination question and the verifying of the completed examination;

enabling, by the processor, a plurality of subjective scores corresponding to the at least one examination question to be inputted into a database, the plurality of subjective scores being based on a plurality of pre-hiring interviews of a plurality of labor resources, and the plurality of subjective scores being different from the examination score;

adjusting, by the processor, in response a predetermined number of the plurality of subjective scores corresponding to the at least one examination question having been inputted into the database, the weighting attribute associated with the at least one examination question based on the plurality of subjective scores and the examination score;

establishing, by the processor, a compensation rate for the labor resource based on a compensation rate matrix and the examination score, wherein the compensation rate matrix is defined based on the skill requirement and the skill level;

comparing, by the processor, the established compensation rate to a predetermined pre-stored compensation rate threshold not to be exceeded; and creating, by the processor, a report including the examination score and the established compensation rate.

2. The system of claim 1, further comprising providing a status of the answer associated with the labor resource.

3. The system of claim 2, further comprising:
performing an analysis of the answer to obtain at least one of examination time and labor resource comparisons; and
creating a report based upon the examination score and the analysis.

4. The system of claim 3, further comprising adjusting weight values for the at least one examination question based upon an interview of the labor resource following the examination.

5. The system of claim 4, wherein the skill level includes a level based upon an experience timeframe threshold.

6. The system of claim 5, wherein the at least one examination question is based on an experience timeframe threshold.

7. The system of claim 6, wherein the at least one examination question is created by a user.

8. An article of manufacture including a non-transitory, tangible computer readable medium having instructions stored thereon that, in response to execution by a computer-based system for providing an assessment of a labor resource, cause the computer-based system to perform operations comprising:

enabling, by the computer based system, selection of a skill requirement that is expected of an ideal labor resource from a plurality of skill requirements;

receiving, by the computer based system, an inputted skill level associated with the selected skill requirement that is expected of the ideal labor resource;

determining, by the computer based system, at least one examination question of an examination for assessing the labor resource based on the selected skill requirement and the inputted skill level, wherein a weighting attribute is associated with the at least one examination question;

receiving, by the computer based system, an answer to the at least one examination question from the labor resource within a predetermined timeframe; verifying, by the computer based system, all examination questions of the examination are answered; scoring, by the computer based system, the answer to create at least a portion of an examination score, wherein the examination score is based, at least in part, on the weighting attribute associated with the at least one examination question and the verifying of the completed examination;

enabling, by the computer based system, a plurality of subjective scores corresponding to the at least one examination question to be inputted into a database, the plurality of subjective scores being based on a plurality of pre-hiring interviews of a plurality of labor resources, and the plurality of subjective scores being different from the examination score;

adjusting, by the computer based system, in response to a predetermined number of the plurality of subjective scores corresponding to the at least one examination question having been inputted into the database, the weighting attribute associated with the at least one examination question based on the plurality of subjective scores and the examination score;

establishing, by the computer based system, the compensation rate for the labor resource based on a compensation rate matrix and the examination score, wherein the rate compensation matrix is defined based on the skill requirement and the skill level;

comparing, by the computer based system, the established compensation rate to a predetermined pre-stored compensation rate threshold not to be exceeded; and creating, by the computer based system, a report including the examination score and the established compensation rate.

9. The computer readable medium of claim 8, further comprising displaying the examination question to the labor resource.

10. The computer readable medium of claim 8, wherein the labor resource is rejected based on exceeding the compensation rate threshold.

11. A method comprising:
enabling, by a computer based system for providing an assessment of a labor resource, selection of a skill requirement that is expected of an ideal labor resource from a plurality of skill requirements;

receiving, by the computer based system, an inputted skill level associated with the selected skill requirement that is expected of the ideal labor resource;

determining, by the computer based system, at least one examination question of an examination for assessing the labor resource based on the selected skill requirement and the inputted skill level, wherein a weighting attribute is associated with the at least one examination question;

receiving, by the computer based system, an answer to the at least one examination question from the labor resource within a predetermined timeframe; verifying, by the computer based system, all examination questions of the examination are answered; scoring, by the computer based system, the answer to create at least a portion of an examination score, wherein the examination score is based, at least in part, on the weighting attribute associated with the at least one examination question and the verifying of the completed examination;

enabling, by the computer based system, a plurality of subjective scores corresponding to the at least one examination question to be inputted into a database, the plurality of subjective scores being based on a plurality of pre-hiring interviews of a plurality of labor resources, and the plurality of subjective scores being different from the examination score;

adjusting, by the computer based system, in response to a predetermined number of the plurality of subjective scores corresponding to the at least one examination question having been inputted into the database, the weighting attribute associated with the at least one examination question based on the plurality of subjective scores and the examination score;

established, by the computer based system, a compensation rate for the labor resource based on a compensation rate matrix and the examination score, wherein the compensation rate matrix is defined based on the skill requirement and the skill level;

comparing, by the computer based system, the established compensation rate to a predetermined pre-stored compensation rate threshold not to be exceeded; and creating, by the computer based system, a report including the examination score and the established compensation rate.

12. The method of claim 11, wherein the labor resource is rejected based on exceeding the compensation rate threshold.

13. The method of claim 12, wherein the method further includes providing a status of the answer associated with the labor resource.

14. The method of claim 13, wherein the method further includes: performing an analysis of the answer to obtain at least one of examination time and labor resource comparisons; and creating a report based upon the examination score and the analysis.

15. The method of claim 14, wherein the method further includes adjusting weighting values for the at least one examination question based upon an interview of the labor resource following the examination.

16. The method of claim 15, wherein the skill level includes a level based upon an experience timeframe threshold.

17. The method of claim 16, wherein the at least one examination question is based on an experience timeframe threshold.

18. The method of claim 17, wherein the at least one examination question is created by a user.

\* \* \* \* \*